United States Patent [19]

Peters et al.

[11] Patent Number: 5,142,569
[45] Date of Patent: Aug. 25, 1992

[54] APPARATUS FOR SELECTIVELY ENABLING SUBSCRIBER DEVICE TO RESPOND TO RINGING SIGNAL IN DEPENDENCE UPON RINGING CADENCE

[75] Inventors: George W. Peters, Palm Bay; Jonathan D. Luckey, Melbourne Beach; Robert H. Kraemer; Scott S. Parker, both of Melbourne, all of Fla.

[73] Assignee: Data Accessory Corporation, Fla.

[21] Appl. No.: 512,982

[22] Filed: Apr. 23, 1990

[51] Int. Cl.⁵ .............................................. H04M 3/42
[52] U.S. Cl. .................................... 379/201; 379/373
[58] Field of Search ............... 379/201, 373, 179, 374, 379/375, 199, 180, 217

[56] References Cited

U.S. PATENT DOCUMENTS

| | | | |
|---|---|---|---|
| 4,723,271 | 2/1988 | Grundtisch | 379/179 X |
| 4,782,516 | 11/1988 | Mattley et al. | 379/201 |
| 4,998,273 | 3/1991 | Nichols | 379/373 X |
| 5,029,202 | 7/1991 | Doernbach, Jr. et al. | 379/375 X |

FOREIGN PATENT DOCUMENTS 0239744 10/1987 Japan .................................. 379/373

Primary Examiner—James L. Dwyer
Assistant Examiner—Ahmad F. Matar
Attorney, Agent, or Firm—Evenson, Wands, Edwards, Lenahan & McKeown

[57] ABSTRACT

A ringing cadence filtering apparatus, which controllably prevents a subscriber device receiving ringing signals other than those having a prescribed cadence, is interposed betweeen a telephone line and a line device that has been assigned one of the telephone numbers of a multi-cadence service. It includes a controlled switching circuit through which a communication path between the telephone line and the line device connection port is normally interrupted. When a rining signal is present on the telephone line, whether or not the interruption is terminated and a path provided through the apparatus will depend upon whether the ringing cadence is that of the telephone number of the line device. To effect this determination, the telephone line input port is coupled to a plurality of ringing signal cadence detection circuits, each of which is responsive to a respectively different ringing cadence. However, only one of the cadence detection circuits has its output coupled to control the controlled switching circuit. To permit the subscriber line device to initiate an outgoing call, the apparatus includes an off-hook detector circuit, which causes the controlled switching circuit to establish a communication path from the telephone line connection port to the subscriber line device connection port in response to detecting an off-hook condition of the subscriber line device, in the absence of any other subscriber line device being connected with the telephone line.

17 Claims, 3 Drawing Sheets

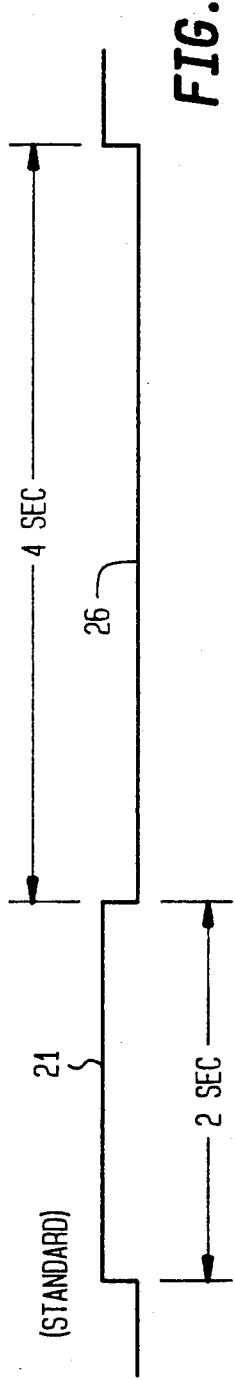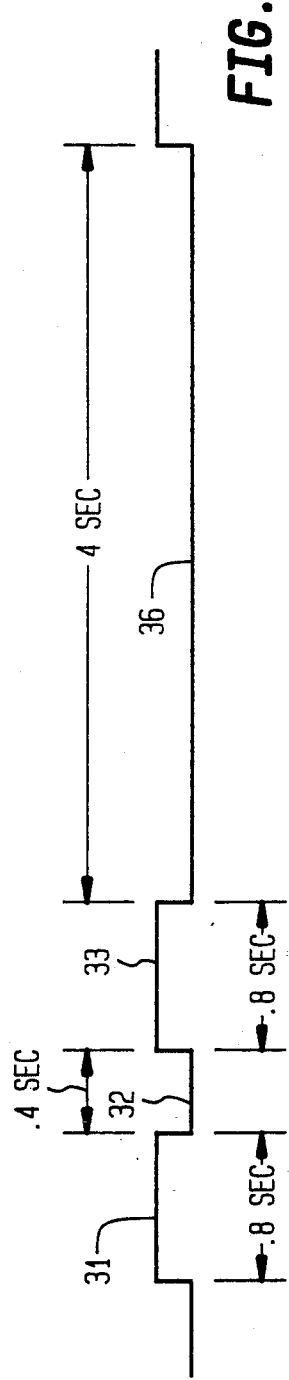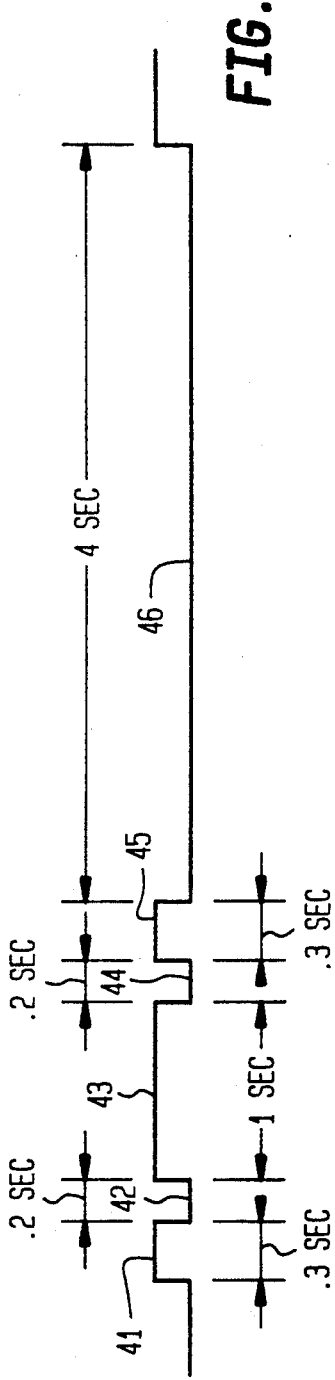

APPARATUS FOR SELECTIVELY ENABLING SUBSCRIBER DEVICE TO RESPOND TO RINGING SIGNAL IN DEPENDENCE UPON RINGING CADENCE

FIELD OF THE INVENTION

The present invention relates in general to telephone systems and is particularly directed to a ringing cadence-controlled filtering apparatus which controllably prevents a subscriber device from receiving ringing signals other than those having a prescribed ringing cadence.

BACKGROUND OF THE INVENTION

Telephone companies have recently begun offering customers the option of having multiple ringing cadence capability on a single telephone line. In accordance with this capability, one or more additional telephone numbers, each of which has its own distinctive cadence, is added to the regular service on the installed line. A typical residential application would be to serve the needs of a household with teenagers, each of whom can be provided with a separate telephone having his or her own telephone number without the expense of a dedicated line. Instead, listening to the ringing tone allows members of the household to know for whom the call is intended, so that a particular individual can answer the call.

It goes without saying that such a service may also be utilized with devices other than personal telephones and in other than residential environments. For example, with the proliferation of different types of telephone line-connected communication equipment, such as facsimile communication devices and computer terminals, this multiple ringing cadence service offers the customer a mechanism of gaining more effective use of the telephone network without the costly burden of adding an additional line for each device. A major problem in utilizing the service is the fact that even though different devices may have been assigned respectively different numbers, every device will ring whenever any of the ringing cadences is present on the line, as every device is connected to the line. In the service option provided by the telephone company, selective answering of the call requires human intervention to know which device to pick up.

One proposal to solve this problem is described in the U.S. Pat. No. 4, 782,518, to Mattley et al, entitled "Apparatus for Converting Distinctive Ring to Selective Ring in Telephone Lines", issued Nov. 1, 1988. According to this patented scheme, the telephone line is coupled to the input port of a ringing cadence responsive multiplexer, multiple output ports of which are coupled to line devices having respectively different telephone numbers (associated with respectively different ringing cadences of the multi-ring service offered by the telephone company). Depending upon the ringing cadence of an incoming call, the input port is switched though one of plural sets of relay contacts of the multiplexer to one of its output ports, so that the associated line device may receive ringing signals. A basic shortcoming of this device is the fact that all subscriber line devices making use of the special service must be either located immediately adjacent to the device, or be routed to one of its output ports, usually by way of a dedicated length of cable through one or more rooms of a building between the subscriber device and the switch. Moreover, the Mattley et al device provides no indicator light or display to indicate which line is in use.

SUMMARY OF THE INVENTION

In accordance with the present invention, rather require every subscriber device, to which a respectively different telephone number has been assigned, to be connected to a central multiplexer device which controls the selective interconnection of the telephone line to all line devices, ringing cadence selectivity is accomplished by means of a filtering apparatus which is interposed between the telephone line and a respective line device that has been assigned one of the telephone numbers of the multi-cadence service provided by the telephone company, and is operative so as to controllably prevent that line device from receiving ringing signals other than those having its associated ringing cadence. For this purpose, the present invention comprises a telephone line connection port for receiving incoming ringing signals from a telephone line, the incoming ringing signals being any of a plurality of ringing signals having respectively different cadences in association with respectively different subscriber numbers as a special service by the telephone company, and a subscriber line device connection port for connection to the line device. Interposed between the telephone line connection port and the line device port is a controlled switching circuit through which a communication path between the telephone line connection port and the subscriber line device connection port is normally interrupted. When a ringing signal is present on the incoming telephone line, whether or not this interruption is terminated and a path provided through the switch will depend upon whether or not the ringing cadence of the ringing signal is that particular cadence which is associated with the telephone number of the line device.

To effect this determination, the telephone line input port is coupled to a plurality of ringing signal cadence detection circuits, each of which is responsive to a respectively different ringing cadence. Each ringing cadence detection circuit monitors the cadence of an incoming ringing signal presented from the telephone line and produces an output signal when it detects its ringing cadence. The output of only one of the ringing cadence detection circuits is coupled through a bank of selector switches to the switching circuit, so as to cause the switching circuit to establish a communication path from the telephone line connection port to the subscriber line device connection port, only if the cadence of the incoming ringing signal matches the cadence of the coupled circuit. An additional selector switch is coupled in circuit with the ringing cadence detection circuitry to selectively control the local line device from being coupled to the line. When turned-on, this additional selector switch prevents the line device from being connected to the line during ringing. When turned-off, the local device may pick-up, provided that the incoming ringing signal is not a selected ringing cadence. Thus, the controlled switching circuit establishes a communication path between the telephone line and the line device only in response to an output signal produced by the cadence detection circuit which is associated with the subscriber number for that line device. If the cadence of an incoming ringing signal is that associated with a different line device, the communication path remains interrupted.

To permit the subscriber line device to initiate an outgoing call, the apparatus includes an off-hook detector circuit, which is coupled to the subscriber line device connection port and the controlled switching device. The off-hook detector causes the controlled switching circuit to establish a communication path from the telephone line connection port to the subscriber line device connection port in response to detecting an off-hook condition of the subscriber line device, in the absence of any other subscriber line device being connected with the telephone line. If another line device is already connected, the off-hook detector does not enable the switch.

The apparatus according to the present invention includes a control circuit which controls the operation of each ringing signal cadence detection circuit, such that no communication path through the switch is effected until subsequent to the termination of the ringing signal which causes the generation of an output signal from the cadence detection circuit associated with the subscriber number of the associated line device. In addition, an auxiliary input jack is coupled in parallel with the input port, so that the apparatus of the invention may be extended to other units.

BRIEF DESCRIPTION OF THE DRAWINGS

FIGS. 3-5 are respective ringing cadence timing diagrams illustrating the duration characteristics of three different types of ringing signals.

DETAILED DESCRIPTION

The present invention will now be described with reference to FIGS. 1 and 2 which, taken together, constitute a schematic diagram of a ringing cadence-controlled filtering apparatus which controllably prevents a subscriber device from receiving ringing signals other than those having a prescribed ringing cadence. Unlike the above-referenced Mattley et al device, the filtering apparatus of the present invention is a two-port, modular unit that is interposed directly between the telephone line and a respective subscriber line device, such as a telephone, facsimile machine, computer modem, etc, that is to be used in conjunction with a single line, multi-number service offered by the telephone company.

Figure 1:
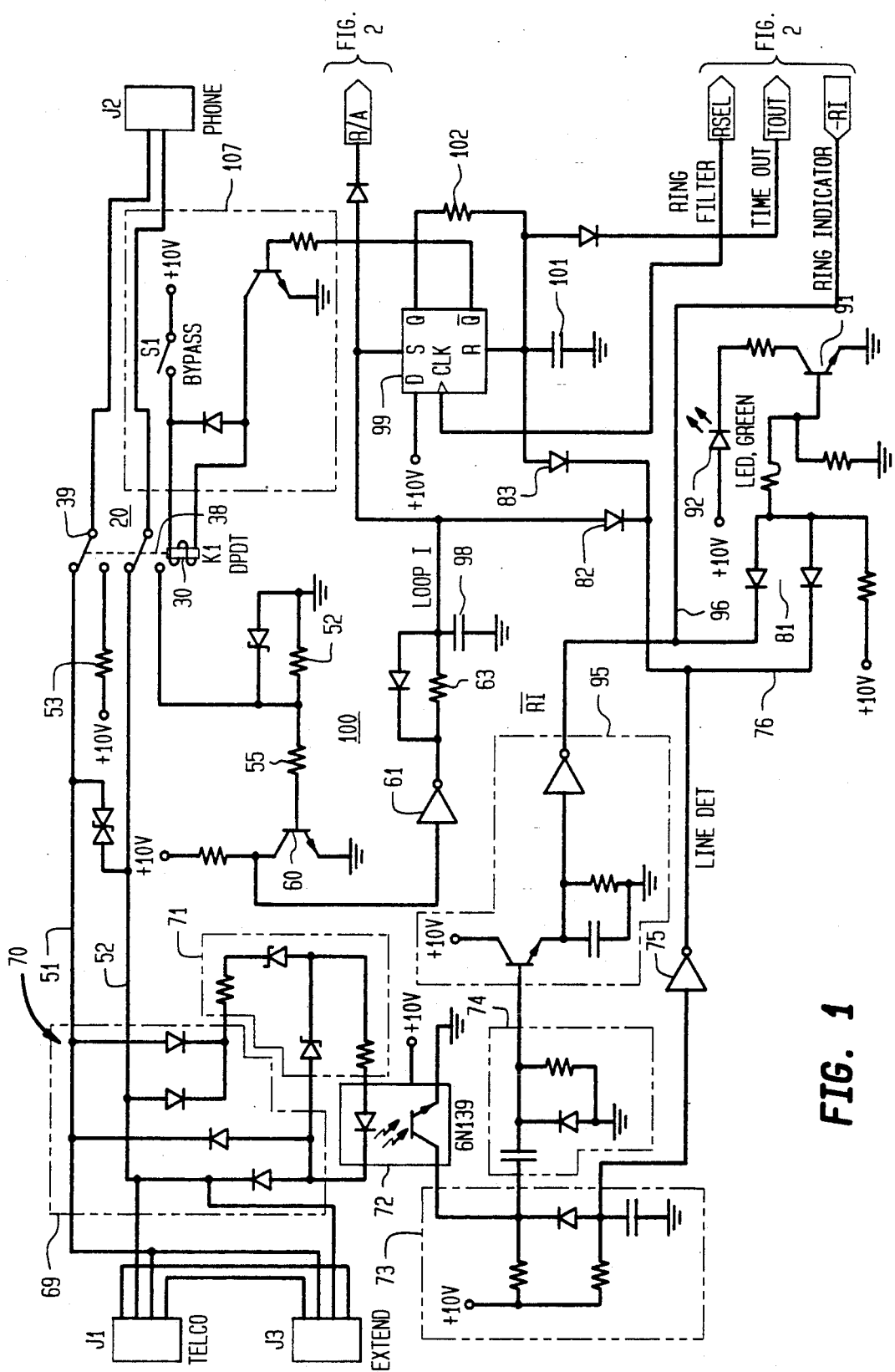
FIGS. 1 and 2, taken together, constitute a schematic diagram of a ringing cadence-controlled filtering apparatus in accordance with a preferred embodiment of the present invention.

More particularly, as shown in FIG. 1, connection to a telephone line from a telephone company's central office is by way of a first, telephone line connection port J1, while connection to a subscriber line device (e.g. telephone, not shown) is effected by way of a second, subscriber line connection port J2. Coupled in parallel with telephone line connection port J1 is an auxiliary port J3 for providing an extension connection to other units. Port J1 receives incoming ringing signals from the telephone line, the incoming ringing signals being any of a plurality of ringing signals having respectively different cadences in association with respectively different subscriber numbers as a special service by the telephone company. As will be described below, via a set of jumper connections, the apparatus of the present invention may be programmed to accommodate different ON/OFF characteristics of the ringing cadences of ringing signals supplied by the telephone company. As a typical, but non-restrictive example, the principal number assigned to the customer may have the standard two seconds-on, four seconds-off ringing cadence, occurring within respective time slots 21 and 26, as shown in the ringing cadence timing diagram of FIG. 3. A first auxiliary number may have a two short ring burst, defined by two eight hundred millisecond rings 31, 33 between which a four hundred millisecond off time 32 is interposed, followed by a four second off time 36, as shown in FIG. 4. A second auxiliary number may be defined by the ring cadence shown in FIG. 5, having an initial 300 millisecond burst 41 followed by a 200 millisecond off time 42 and then a one second burst 43. The one second burst 43 is followed by another 200 millisecond off time 44 and a terminating 300 millisecond burst 45 and then a four second off time 46.

Interposed between telephone line connection port J1 and device port J2 is a controlled switching circuit 20, including a relay K1 having a coil 30 and an associated set of relay switching contacts 38 and 39 coupled in circuit with a pair of port-to-port connection lines 51, 52 through which a communication path between telephone line connection port J1 and device connection port J2 is to be controllably provided. FIG. 1 shows relay contacts 38 and 39 in their default states, in which port J1 is directly coupled through lines 51 and 52 to port J2. When the circuit is powered up, relay coil 30 is normally energized, so that the relay contacts decouple port J2 from port J1, thereby interrupting the default connection between the subscriber line device and the telephone line. In the default condition, relay contact 39 couples one line of port J2 through a terminating resistor 53 to +V (e.g. 10V) and relay contact 38 couples the other line of port J2 through a voltage divider 54 to the base of an NPN transistor 60.

As mentioned earlier and as will be described in detail below, when a ringing signal is present on telephone line (and thereby applied to port J1, whether or not the interruption of the circuit path through switching circuit 20 is maintained, or whether it is terminated so that a path is provided through the relay contacts of switching circuit 20, will depend upon whether or not the ringing cadence of the ringing signal is that particular cadence which is associated with the telephone number of the line device.

To make this determination, the telephone line connection port J1 is coupled through a line coupling circuit 70 having a bridge rectifier 69, coupled via a resistor-diode coupling network 71, to an electro-optic coupler 72, the output of which is coupled to a line voltage detect (low pass) filter 73 and a ringing signal (high pass) filter 74. The output of line voltage detect filter 73 is coupled through an inverter 75 to gate 81 and diodes 82 and 83. The output of gate 81 provides base drive for a transistor circuit 91, the collector-emitter path is coupled in circuit with an LED indicator 92 and associated power supply terminals (+V and ground). LED indicator 92 is normally illuminated to indicate that the line is 'ready for use'. Whenever the telephone line (coupled to port J1) is seized, the output of inverter 75 changes state (goes low), disabling one input of gate circuit 81 and thereby turning off transistor 91 and deenergizing LED 92. The anode of diode 82 is coupled to a capacitor 98 within a loop current detector 100, to be described, and to the set input of a relay control latch (flip-flop) 99. Loop current detector 100 has two modes of operation ———1) when line detect inverter 75 senses that the line is in use, and 2) on incoming ring, through waveform shaping circuit 95, so that a (local subscriber)

line device cannot connect to the line or the line is in use or (with a select switch turned-on) it is ringing. The output of the line detector goes low, which keeps capacitor 98 discharged and prevents flip-flop 99 from being set 'ON' (connecting the device to the line). Flip-flop 99 will be set 'ON' in response to a correct ring cadence detect output from the ring filter (FIG. 2), when clocked at its clock input.

The QBAR output of flip-flop 99 is coupled to a relay driver circuit 107 for supplying energizing current for relay coil 30, so that then whenever flip-flop 99 is set (its QBAR output is low), relay K1 is deenergized, thereby placing relay contacts 38, 39 in the default condition shown. Relay driver circuit 107 includes a BYPASS switch S1 coupled between +10V and relay winding 30. Switch S1 is used to selectively disable the apparatus and connect the telephone line to the local device.

As pointed out above, as long as the output of inverter 75 is low, indicating the seizure of the telephone line by another device, diode 82 keeps capacitor 98 discharged, so that flip-flop 99 cannot be set by the subscriber device going off-hook Similarly, diode 83 is coupled to capacitor 101, to the reset input of flip-flip 99 and, via coupling resistor 102, to the Q output of flip-flop 99.

(High pass) ringing signal filter 74 removes dial pulses and couples ringing signals to a waveform shaping circuit 95, which provides an output pulse the duration of which corresponds to the duration of the ringing signal, as shown in FIGS. 3, 4 and 5, referenced above. The output of waveform shaping circuit 95 is coupled to a second input of gate 81 and, by way of a ring indication line 96, to a plurality of ringing signal cadence detection circuits 111, 113 and 115, shown in FIG. 2. As will be described below, each of the ringing signal cadence detection circuits is responsive to a respectively different ringing cadence and will produce an output only when the ringing signal cadence to which it is responsive is detected. The outputs of ringing signal cadence detection circuits 111, 113 and 115 are coupled to respective input terminals 121, 123 and 125 of manually operable selector switches S2-1, S2-3, and S2-5 of a switch bank S2. The output ports of selectors S2-1, S2-3 and S2-5 are connected in common to one input of a gate 118, the output of which is coupled over a ring filter output line 120 to the clock input of flip-flop 99, the D input of which is hardwired high. Only one of switches S2-1, S2-3 and S2-5 is closed, in association with that one of the ringing cadences shown in FIGS. 3, 4 and 5 that is to be detected. Whenever a valid ringing signal is detected by the that one of ringing signal cadence detection circuits 111, 113 and 115 whose associated selection switch is closed, the input to gate 118 on line 126 goes high. As will be discussed below, if a detected valid ringing cadence is followed by a quiescent period (on the order of a 2.5 second interval) that occupies a major portion of the four second off period following the ringing burst (represented by a high voltage on line 119 being applied to a second input of gate 118), then ring filter line 120 changes state (goes high), setting flip-flop 99 and deenergizing relay K1. Switch bank S2 includes a further selector switch S2-7 an input port 127 of which is coupled to line 155 of up-counter 130 and an output port which is coupled via a line 128 to the set input of flip-flop 99. This additional selector switch, when turned on, causes flip-flop 99 to hold relay K1 energized, to prevent the local device from picking up (going off-hook) during ringing. When turned-off, flip-flop 99 is set, to de-activate relay K1 and allow the device to answer the ring regardless of whether the ring is the selected cadence.

To control the operation of the ringing signal cadence detectors, ringing indication line 96 is coupled through an inverter 122 to the reset input of an up-counter 130 having an internal free running clock and, via diode 124, to an oscillator 140. Up-counter 130 is active at the end of a ring pulse time to reset up-counter 142 (and also up-counter 130) if one of the ring cadences, to which one of detection circuits 111, 113 and 115 is tuned, is detected. Counter 130 produces an output on a first timer line 133 a prescribed period of time (e.g. 20 milliseconds) after being reset. Line 133 is coupled to the reset input of an up-counter 142 and to the clock input of a master reset latch 160. The delayed output on line 133 serves to reset up-counter 142. Counter 130 produces a second output on ring termination line 119 which changes state (goes high) approximately 2.5 seconds after counter 130 has been reset and is coupled to a second input of gate 118. This 2.5 second delay is used to validate a detected ring signal by waiting for a major portion of the four second quiescent interval that follows ringing bursts associated with any of the ring signal shown in FIGS. 3–5 before indicating the detection of a valid ring. Line 119 is also coupled to the D input of master reset latch 160, so that upon the next pulse on line 133, latch 160 will be set.

A third output of counter 130 on line 155 changes state (goes high) if a relatively long predetermined period of time (e.g. on the order of five seconds) has elapsed since the counter was last reset, indicating an invalid ringing signal. This signal on line 155 is used as a time-out signal to the reset input of relay control latch 99 (FIG. 1) and thereby maintains the communication path through switch 20 interrupted. Time out line 155 is also coupled through diode 156 to disable counter 130 upon the occurrence of a five second time out signal.

Oscillator 140 has an output coupled to the clock input of up-counter 142, respective outputs 151-154, 157 of which are coupled through a set of programmable jumper connections JMP2 to ringing signal cadence detector circuits 111-115 for validating the timing of monitored ringing signals, as will be described below. Programmable jumper connections JMP2 allow the user to program the ringing cadence response characteristics of detector circuits 111-115 to accommodate different ON/OFF sequences in the ringing signals supplied by the telephone company. Another (inverted) output of oscillator 140 is coupled to the clock input of a timing latch (flip-flop) 146. The set input of timing latch 146 is coupled through line 159 to the Q2 output of up-counter 142 via jumper connections JMP2.

As explained above, each of ringing signal detection circuits 111, 113 and 115 monitors the cadence (on-off characteristics) of successive ringing pulses on ringing indication line 96 and determines whether or not that cadence matches the respective on-off characteristics of its particular ring type. For this purpose each of ringing signal cadence detectors 111, 113 and 115 is comprised of timing logic circuitry that compares the times of occurrence of transitions in the ringing signal pulses on ringing indication line 96 with a set of timing windows during which transitions in the ringing signal, if valid, should occur.

Specifically, for the standard or normal ringing signal having the two second on, four second off timing characteristic shown in FIG. 3, cadence detector 111 looks to see whether a ring burst transition occurs approximately two seconds after the beginning of the ring burst interval 21. For this purpose, cadence detector 111 comprises a one-half second one-shot 171 coupled to count line 151 the state of which changes (goes high) 1.8 seconds after counter 142 has been reset and successively incremented by the output of oscillator 140. At the expiration of its one-half second set state, the Q output of one-shot 171 goes back to its monostable state (goes low). During this 1.8 to 2.3 second time interval or window, input 175 of AND gate 173 is high. If its second input from ringing indication line 96 undergoes a low to high transition during this interval, then the output of AND gate 173 will change state, clocking a ring detect output latch 181, causing its Q output to go high. If switch S2-1 is closed, this high state is coupled over line 126 to one input of gate 118.

For detecting a two burst ringing signal shown in FIG. 4, having two 800 millisecond on-times bracketing a 400 milliseconds off-time, cadence detector 113 comprises an AND gate 183, one input of which is coupled to count line 152, the state of which goes high for a 200 millisecond interval 0.8 seconds after counter 142 has been reset and successively incremented by the output of oscillator 140. Namely, count line 152 is high for a 0.8 to 1.0 second interval following the beginning of a ring burst. The output of AND gate 183 is coupled to cascaded flip-flops 185 and 191. If two successive 0.8 second ring bursts as shown in FIG. 4 are received, their corresponding ring pulses on line 96 will cause AND gate 183 to successively clock flip-flops 185 and 191, so that the Q output of ring detect output latch 191 will go high. If switch S2-3 is closed, this high state is coupled over line 126 to one input of gate 118.

For detecting the three burst ringing signal shown in FIG. 5, having an initial 300 millisecond burst 41 followed by a 200 millisecond off time 42, followed by another 200 milliseconds off-time 44 and a terminating 300 millisecond burst 45, cadence detector 115 includes timing latch 146, the D input of which is coupled to count output line 154 from up-counter 142. The Q output of latch 146 is coupled through a set of programmable jumper connectors JMP1 to one input of an AND gate 201, a second input of which is coupled to ring indicator line 96. Programmable jumper connectors JMP1 is also coupled via line 157 to programmable jumper connectors JMP2 to allow AND gate 201 to be selectively coupled directly to counter 142. The output of AND gate 201 is coupled to the clock inputs of latch 203 and ring detect output latch 211. Cadence detector 115 further includes a second AND gate 205 inputs of which are coupled to ring indicator line 96 and a count line 153 from counter 142. The output of AND gate 205 is coupled to the clock input of latch 207, which is coupled in cascade between latch 203 and ring detect output latch 211. Count output line 154 from up-counter 142 causes the Q output of latch 146 to go high for a 200-450 millisecond interval, while counter output line 153 goes high for a 1.0 to 1.2 second interval. As a consequence, AND gate 201 controls the clocking of latches 203 and 211 at times associated with the initial 300 millisecond ring burst 41 and the terminating 300 millisecond ring burst 45, shown in FIG. 5. Similarly, since AND gate 205 is controlled by a count signal generated by counter 142 at a time when the middle one second, ring burst 43 should occur, the cascading of latches 203, 207 and 211 effectively constitutes a timing filter for detecting the timing of occurrences of transitions in the successive ring bursts that form the ringing signal cadence shown in FIG. 5. Namely, if the three successive ring bursts 41, 43, 45 as shown in FIG. 5 are received, their corresponding ring pulses on line 96 will cause cascaded latches 203, 207, 211 to be clocked by AND gates 201 and 205, so that the Q output of ring detect output latch 211 go high. If switch S2-5 is closed, this high state is coupled over line 126 to one input of gate 118.

Figure 2:
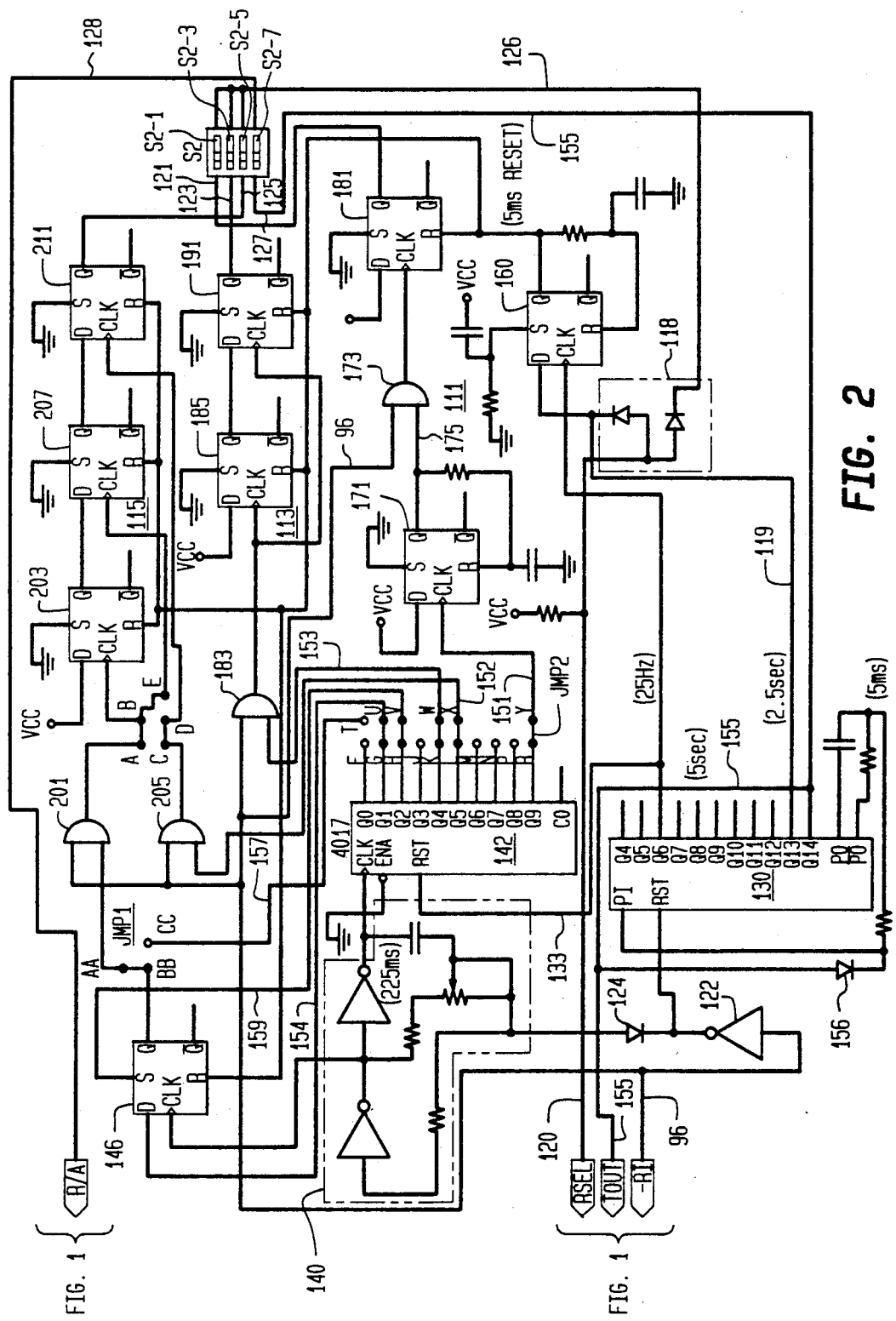

As pointed out above, in addition to being responsive to the state of ring filter output line 120, which is coupled to the output of gate 118 within the ringing cadence detection circuitry in FIG. 2, controlled switching circuit 20 (FIG. 1) is also coupled to a loop current detector 100 which causes controlled switching circuit 20 to establish a communication path from telephone line connection port J1 to subscriber line device connection port J2 in response to detecting an off-hook condition of the subscriber line device, in the absence of any other subscriber line device being connected with the telephone line. If another line device has already seized the line, off-hook detector 100 does not enable the switch.

Specifically, during its normal state, with relay K1 energized, relay contact 39 couples one line of port J2 through a terminating resistor 53 to +V (e.g. 10V), while relay contact 38 couples the other line of port J2 through a voltage divider 54 to the base of an NPN switching transistor 60. The normally biased-high collector of transistor 60 is coupled to an inverter 61. As a consequence, if the subscriber goes off-hook, the base of transistor 60 is pulled up, thereby turning transistor 60 on and applying a low voltage (ground) to inverter 61. The output of inverter 61 goes high and charges capacitor 98 through a charging resistor 63. This action sets latch 99, so that its QBAR output goes low, deenergizing relay K1 and thereby connecting the subscriber line device with the telephone line at port J2. If, however, the telephone line had been seized by another device, the output of line voltage detect inverter would be low, forward biasing diode 82 and maintaining capacitor 98 discharged. This action prevents latch from being set by off-hook detector 100, so that relay K1 is held on.

OPERATION

Incoming Call

For purposes of the following description it will be assumed that both the telephone line to which port J1 is coupled, and the subscriber line device, to which port J2 is coupled, are quiet. Relay K1 is energized by the QBAR output of latch 99, which is reset. It will also be assumed that the subscriber line device is a telecopier machine which has been assigned a telephone number whose associated ringing cadence is that shown in FIG. 4. With the apparatus of the present invention inserted in the line between the input jack to the telecopier and a (wall-mounted) telephone line jack, the installer would have closed switch S2-3, so that ring filtered output line will respond only to a cadence detection signal from cadence detection circuit 113.

With an incoming ringing signal (one of those shown in FIGS. 3-5) applied to port J1 from the telephone line, the change in voltage on the line is coupled through bridge rectifier 69 and electro-optic coupler 72 and passed through filter 74 to waveform shaping circuit 95. The pulse output of waveform shaping circuit 95 on line 96, which matches the duration characteristic of the ringing signal, is coupled to indicator LED 92 to produce a burst duration indication.

Coincident with the start of the ringing signal, line 96 changes state (goes low). The output of inverter 122 goes high, resetting counter 130 and allows timing counter 142 to be incremented by clock 140. The high transition at the output of inverter 121 also back biases diode 124, so as to enable the operation of oscillator 140. After the ringing stops, counter 130 begins counting. If no new (false) ring signal is received, counter 130 counts for a period of 2.5 seconds, setting latch 160 and clocking a reset signal to the ringing cadence detection circuits and to flip-flop 99. Thereafter, counters 130 and 142 are successively incremented by their respective clocks and successive transition window signals are coupled to each cadence detector circuits 111, 113 and 115. If the incoming ringing signal is a valid ringing signal which corresponds to the number assigned to the subscriber line device (in the present example, a telecopier having an associated ring cadence shown in FIG. 4) then with switch S2-1 being closed, then line 126 from the Q output of ring detect output latch 191 will apply a high to its associated input of gate 118. Subsequently, 2.25 seconds after the last burst transition on line 96, output line 119 of up-counter 130 will go high, enabling the other input of AND gate 118 and causing a ring filtered signal to be coupled over line 120 to the clock input of relay control latch 99, setting the latch and deenergizing relay K1. With relay K1 deenergized, its contacts 38 and 39 now return to their default positions shown in FIG. 1, so that the communication path through switching circuit 20 is no longer interrupted. Instead, port J1 is coupled to port J2, so that the next ringing signal will be coupled through the switch to the subscriber line device, which then answers the call. The subscriber line device remains connected through switching circuit 20 to telephone line until going back on-hook.

Outgoing Call

As pointed out above, in addition to being responsive to the state of ring filter output line 120, which is coupled to the output of gate 118 within the ringing cadence detection circuitry in FIG. 2, controlled switching circuit 20 is also coupled to a loop current detector 100 which, in the absence of any other subscriber line device being connected with the telephone line, causes controlled switching circuit 20 to establish a communication path from telephone line connection port J1 to subscriber line device connection port J2 in response to detecting an off-hook condition of the subscriber line device. However, if the line is already in use, off-hook detector 100 does not enable switching circuit 20.

Namely, during its normal state, with relay K1 energized, relay contact 39 couples one line of port J2 through a terminating resistor 53 to +V, while relay contact 38 couples the other line of port J2 through a voltage divider 54 to the base of an NPN switching transistor 60. When the local subscriber device goes off-hook, the base of transistor 60 is forward-biased, thereby turning transistor 60 on and applying a low voltage to inverter 61. The output of inverter 61 goes high charging capacitor 98 through resistor 63. This action sets latch 99, so that its QBAR output goes low, deenergizing relay K1 and thereby connecting the subscriber line device with the telephone line at port J2.

On the other hand, if the telephone line is already seized, the output of line voltage detect inverter 75 is low, forward biasing diode gate 82 and maintaining capacitor 98 discharged, thereby preventing latch 99 from being set by off-hook detector 100, so that relay K1 is held on, keeping port J2 disconnected from the local subscriber device. As a result, if a non-selected phone is picked up when the line is in use, no audible signalling will be heard.

As will be appreciated from the foregoing description, ringing cadence selectivity for a telephone line having multi-cadence service is accomplished by means of a dedicated filtering apparatus which is interposed between the telephone line and a respective line device that has been assigned a specific one of the telephone numbers provided by the telephone company, and is operative to controllably prevent that line device from receiving ringing signals other than those having its associated ringing cadence. Since the multi-cadence service may be utilized with a variety of line devices, such as personal handsets, facsimile communication devices and computer terminals, use of the invention with such equipment simply involves an insertion of the device between the telephone line connector (e.g. wall-mounted jack) and the device jack. No extensive wiring to a central site is required, nor is it necessary to locate every different piece of subscriber equipment that has been assigned one of the different cadence numbers immediately adjacent to the unit.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. An apparatus comprising:
    a telephone line connection port arranged to be coupled to a telephone line, said telephone line being capable of supplying plural ringing signals having respectively different cadences in association with respectively different subscriber numbers as a special service by a telephone company;
    a subscriber line device connection port arranged to be coupled to a subscriber line device, said subscriber line device having one of said respectively different subscriber numbers, so that a ringing signal for said subscriber line device is that one of said plural ringing signals the cadence of which is associated with said one of said respectively different subscriber numbers; and
    a ringing signal cadence responsive circuit which monitors ringing signals that are presented from said telephone line to said telephone line connection port and provides a communication path from said telephone line connection port through said apparatus so that said apparatus outputs ringing signals the cadence of which is that associated with only said one of said respectively different subscriber numbers, and otherwise prevents the establishment of a communication path from said telephone line connection port through said apparatus for ringing signals having cadences other than that associated with said one of said respectively different subscriber numbers so that said apparatus is prevented from outputting ringing signals to a subscriber line device.

2. An apparatus according to claim 1, further including an off-hook detector circuit, coupled to said subscriber line device connection port and said ringing signal cadence responsive circuit, for controllably providing said communication path through said apparatus in response to detecting an off-hook condition of said subscriber line device, in the absence of any other subscriber line device being connected with said telephone line.

3. An apparatus according to claim 1, wherein said ringing signal cadence responsive circuit includes a plurality of ringing signal cadence detection circuits, one of which is selectively coupled to provide said communication path through said apparatus in accordance with a selected one of said subscriber numbers, each ringing signal cadence detection circuit generating an output signal in response to detecting a respectively different ringing signal cadence of a ringing signal coupled to said telephone line connection port, the output signal of the selectively coupled ringing signal cadence detection circuit causing said communication path to be provided through said apparatus in response to detecting a ringing signal cadence associated with said selected one of said subscriber numbers.

4. An apparatus according to claim 3, wherein said ringing signal cadence responsive circuit further includes a control circuit for controlling the operation of said plurality of ringing signal cadence detection circuits such that said communication path is prevented from being provided through said apparatus until subsequent to the termination of that ringing signal which causes the generation of an output signal.

5. An apparatus comprising:
- a telephone line connection port for receiving incoming ringing signals from a telephone line, said incoming ringing signals being any of a plurality of ringing signals having respectively different cadences in association with respectively different subscriber numbers as a special service by a telephone company;
- a subscriber line device connection port for connection to a subscriber line device, said subscriber line device having one of said respectively different subscriber numbers, so that an incoming ringing signal for said subscriber line device has a cadence associated with said one of said respectively different subscriber numbers;
- a controlled switching circuit for providing a communication path between said telephone line connection port an said subscriber line device connection port; and
- a plurality of ringing signal cadence detection circuits, each of which monitors the cadence of an incoming ringing signal presented from said telephone line to said telephone line connection port and produces a respective output signal for controllably causing said switching circuit to establish a communication path from said telephone line connection port to said subscriber line device connection port in dependence upon the cadence of said incoming ringing signal, respectively different ones of said cadence detection circuits being responsive to incoming ringing signals of respectively different cadences, and wherein said controlled switching circuit establishes said communication path in response to an output signal produced by that one of said plurality of cadence detection circuits which is associated with said one of said respectively different subscriber numbers, but prevents said communication path from being established for an output signal produced by another ringing signal cadence detection circuit.

6. An apparatus according to claim 5, further including an off-hook detector circuit, coupled to said subscriber line device connection port and said controlled switching device, for controllably causing said controlled switching circuit to establish said communication path from said telephone line connection port to said subscriber line device connection port in response to detecting an off-hook condition of said subscriber line device, in the absence of any other subscriber line device being connected with said telephone line.

7. An apparatus according to claim 5, further including a control circuit for controlling the operation of said plurality of ringing signal cadence detection circuits such that said communication path is prevented from being provided through said controlled switching device until subsequent to the termination of that ringing signal which causes the generation of an output signal produced by that one of said plurality of cadence detection circuits which is associated with said one of said respectively different subscriber numbers.

8. For use with a telephone link over which plural ringing signals having respectively different cadences in association with respectively different subscriber numbers may be supplied as a special service by a telephone company, an apparatus for coupling said telephone line to a respective one of a plurality of subscriber line devices, so that said respective subscriber line device may receive ringing signals associated with its subscriber number, comprising:
- a telephone line connection port arranged to be coupled to said telephone line;
- a subscriber line device connection port arranged to be coupled to said subscriber line device;
- a controlled communication path having a first port coupled to said telephone line connection port, a second port coupled to said subscriber line device connection port, and a control port; and
- a plurality of ringing signal cadence detection circuits, each of which monitors the cadence of an incoming ringing signal presented from said telephone line to said telephone line connection port and produces a respective output signal for application to said control port of said controlled communication path in response to detecting a respectively different one of said plurality of ringing signals; and wherein
- only that ringing signal cadence detection circuit which is associated with said one of said respectively different subscribers numbers has its output coupled to the control port of said controlled communication path, so that any incoming ringing signal other than one having a cadence associated with said one of said respectively different subscriber numbers is prevented from being passed to said subscriber line device, and only those ringing signals whose cadence is associated with said one of said respectively different subscriber numbers are passed through said communication path to said subscriber line device.

9. An apparatus according to claim 8, further including an off-hook detector circuit, coupled to said subscriber line device connection port and said telephone line connection port, for applying an output signal to the control port of said controlled communication path in response to detecting an off-hook condition of said subscriber line device, in the absence of a line seizure representative signal being presented to said telephone line connection port, but otherwise preventing said subscriber line device from being coupled through said controlled communication path to said telephone line.

10. An apparatus according to claim 8, further including a control circuit for controlling the operation of said plurality of ringing signal cadence detection circuits such that a ringing signal is prevented from being passed through said controlled communication path until subsequent to the termination of that ringing signal which causes the generation of an output signal.

11. For use with a telephone link over which plural ringing signals having respectively different cadences in association with respectively different subscriber numbers may be supplied as a special service by a telephone company, an apparatus for coupling said telephone link to a respective one of a plurality of subscriber line device, so that said respective subscriber line device may receive an incoming call associated with its subscriber number, comprising:

a switching circuit having a first port arranged to be coupled to said telephone line, a second port arranged to be coupled to said subscriber line device, a normally interrupted communication path between said first and second ports, and a control port through which said switch is controllably actuated to terminate the normal interruption of said communication path and thereby effectively interconnect said first and second ports so as to enable said respective subscriber line device to receive an incoming call; and a plurality of ringing signal cadence detection circuits, each of which monitors the cadence of an incoming ringing signal presented from said telephone line to said telephone line connection port and produces a respective output signal for application to said control port of said controlled switching circuit in response to detecting a respectively different one of said plurality of ringing signals; and wherein only that ringing signal cadence detection circuit which is associated with said one of said respectively different subscriber numbers has its output coupled to the control port of said controlled switching circuit, so that any incoming ringing signal other than one having a cadence associated with said one of said respectively different subscriber numbers is prevented from being passed to said subscriber line device, and only those ringing signals whose cadence is associated with said one of said respectively different subscriber numbers are passed through said controlled switching circuit to said subscriber line device.

12. An apparatus according to claim 11, further including an off-hook detector circuit, coupled to said second port and said switching circuit, for controllably actuating said switching circuit in response to detecting an off-hook condition of said subscriber line device in the absence of any other subscriber line device being connected with said telephone link.

13. An apparatus according to claim 11, further including a control circuit for controlling the operation of said plurality of ringing cadence detection circuits such that the application of said control signal to the control port of said switching circuit does not occur until the termination of the ringing signal which causes said selectively coupled ringing cadence detection circuit to generate an output signal to controllably actuate said switching circuit.

14. For use with a telephone line by way of which a multi-cadence ringing service is provided by a telephone company to identify plural telephone numbers, a method of coupling said telephone line to a line device, so that said line device may receive an incoming call associated with its telephone number, comprising the steps of:

(a) connecting a first port of a switching circuit to said telephone line and a second port of said switching circuit said line device, said switching circuit being configured to normally interrupt a communication path between its first and second ports, and having a control port through which said switching circuit is controllably actuated, so as to terminate the normal interruption of said communication path and thereby effectively interconnect said first and second ports and thereby enable said respective line device to receive an incoming call;

(b) coupling an incoming ringing signal from said telephone line to a plurality of ringing signal cadence detection circuits, each of which monitors the cadence of said incoming ringing signal and produces a respective output signal that is capable of controllably actuating said switching circuit in response to detecting a respectively different one of said plurality of ringing cadences; and (c) in response to any of said plurality of ringing signal cadence detection circuits detecting a ringing signal cadence other than a cadence that is representative of said one telephone number, maintaining the interruption of said communication path through said controlled switching circuit, so that telephone line is prevented from being coupled to said line device.

15. A method according to claim 14, wherein step (c) further includes the step of, in response to any of said plurality of ringing signal cadence detection circuits detecting a ringing signal cadence that is representative of said one telephone number, coupling the output signal of that detection circuit to the control port of said controlled switching circuit and thereby terminating the interruption of said communication path through said controlled switching circuit, so that telephone line is connected therethrough to said line device.

16. A method according to claim 14, further including the step of (d) detecting an off-hook condition of said line device and controllably actuating said switching circuit in the absence of any other subscriber line device being connected with said telephone line.

17. A method according to claim 15, wherein step (c) further includes the step of controlling the operation of said plurality of ringing cadence detection circuits such that the application of an output signal to the control port of said switching circuit does not occur until the termination of the ringing signal which causes a ringing cadence detection circuit to generate an output signal to controllably actuate said switching circuit.

* * * * *